March 26, 1963  R. F. LONABERGER  3,082,580
GRINDING APPARATUS AND THE LIKE WITH ULTRASONIC CONTROL MEANS
Filed May 26, 1961  8 Sheets-Sheet 1

INVENTOR:
Robert F. Lonaberger,
BY
Alfred E. Ischinger
ATTORNEY.

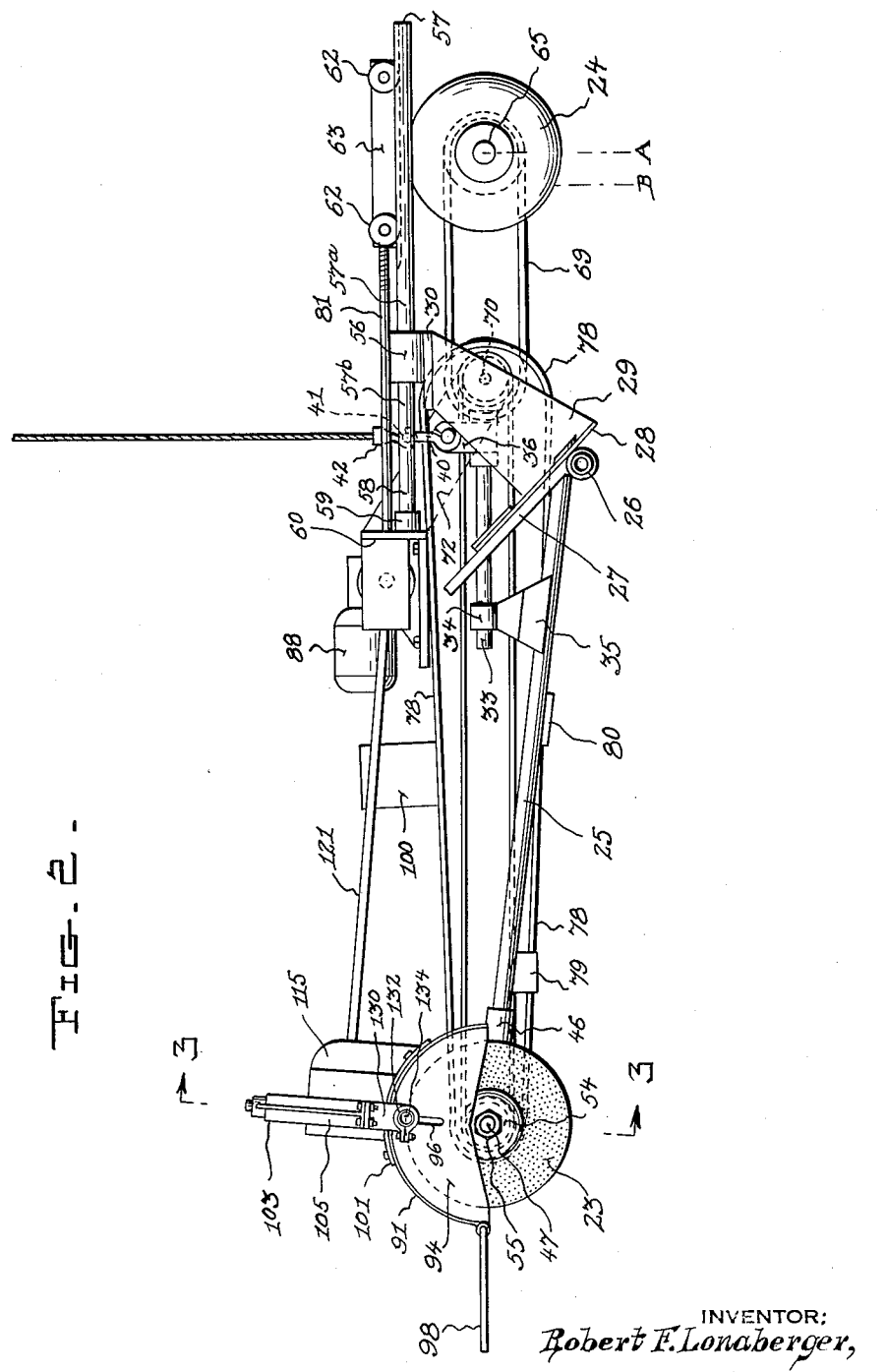

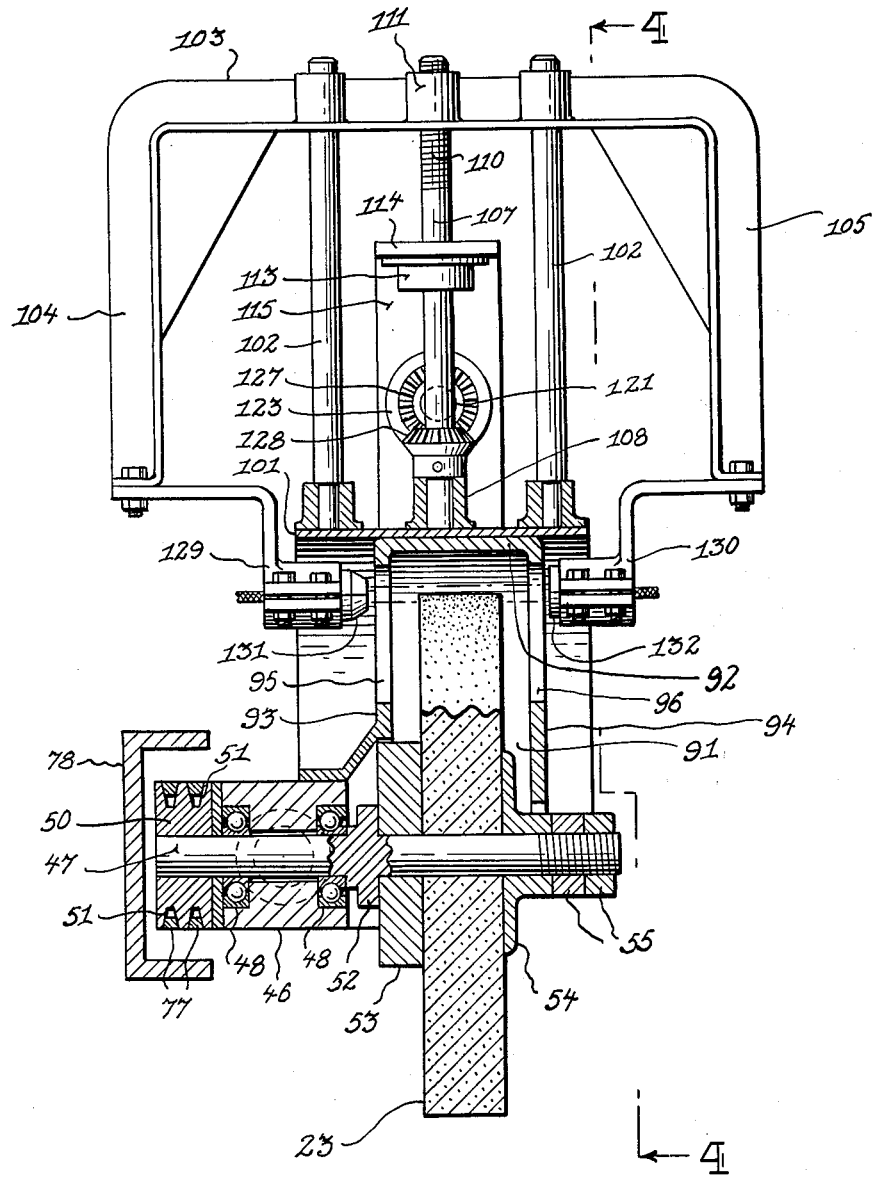

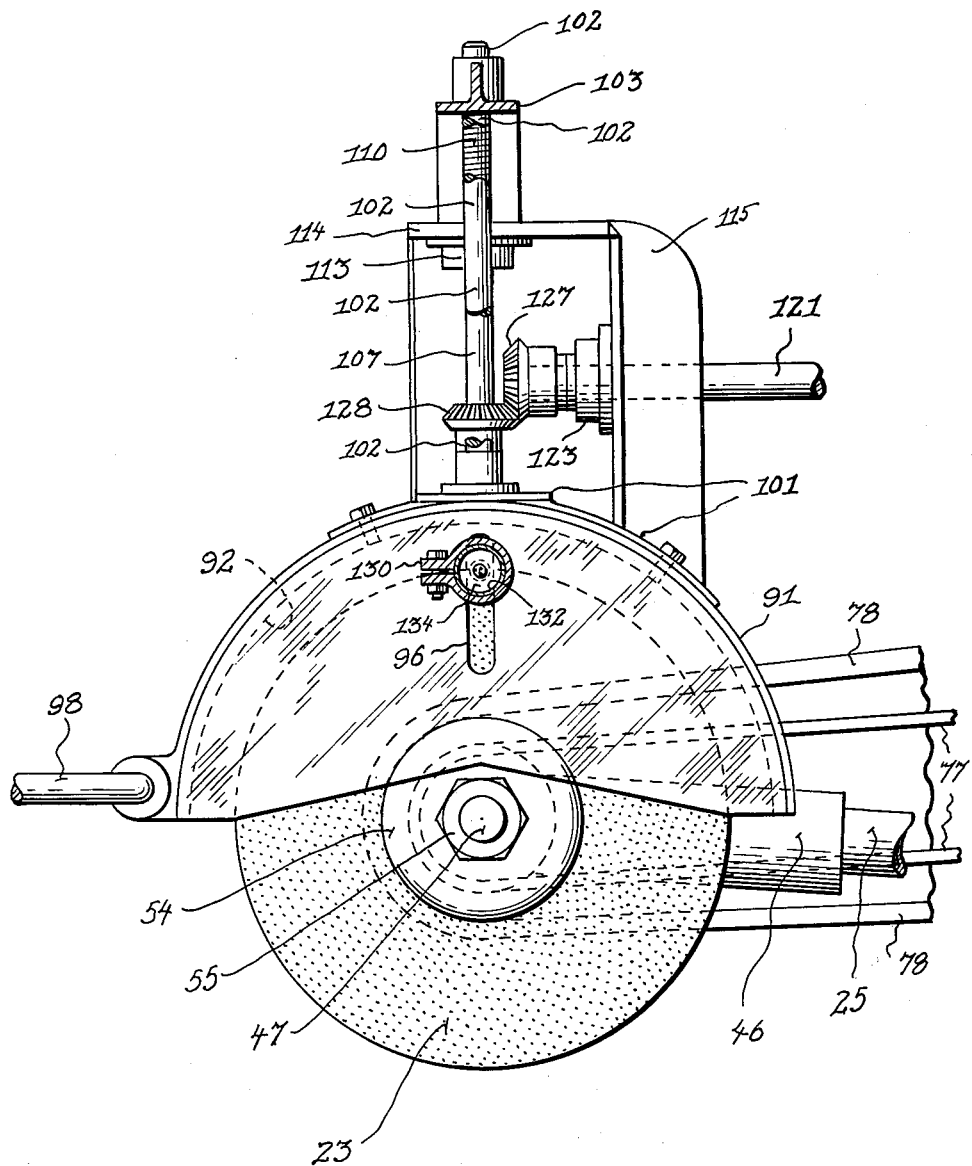

March 26, 1963 R. F. LONABERGER 3,082,580
GRINDING APPARATUS AND THE LIKE WITH ULTRASONIC CONTROL MEANS
Filed May 26, 1961 8 Sheets-Sheet 6
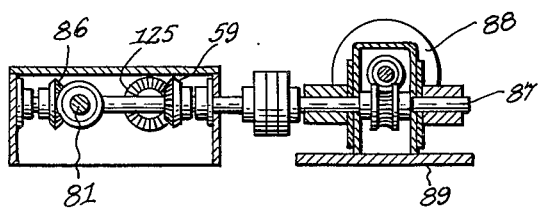
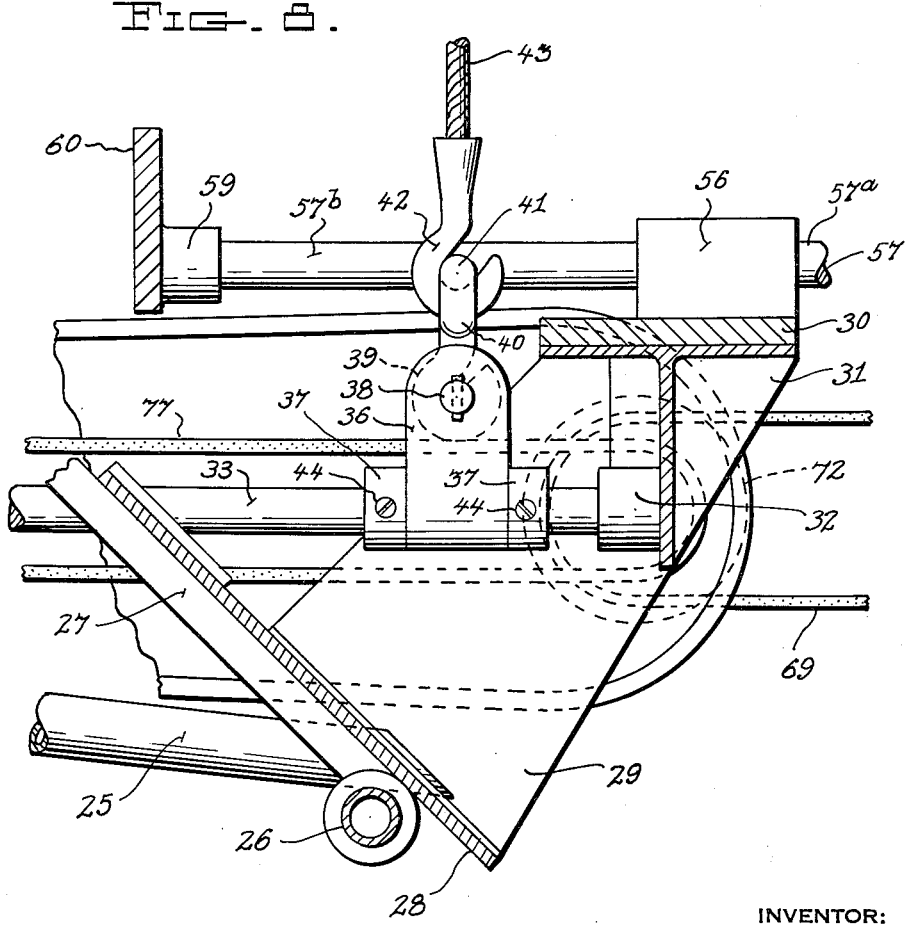
INVENTOR:
Robert F. Lonaberger,
BY
Alfred E. Ischinger
ATTORNEY.

INVENTOR:
Robert F. Lonaberger,
BY Alfred E. Ischinger
ATTORNEY.

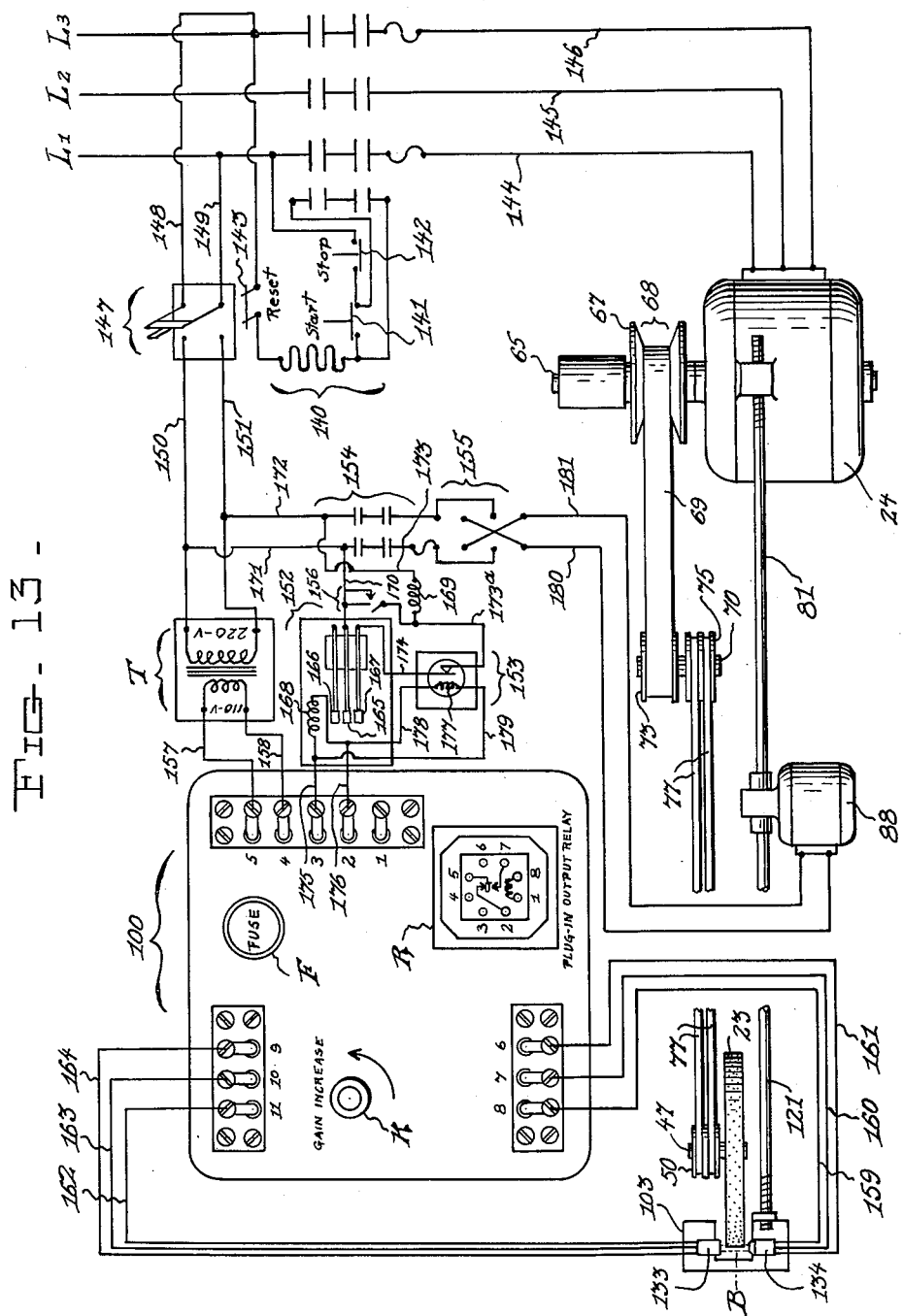

United States Patent Office 3,082,580
Patented Mar. 26, 1963

3,082,580
GRINDING APPARATUS AND THE LIKE WITH
ULTRASONIC CONTROL MEANS
Robert F. Lonaberger, Reading, Pa., assignor to The
Scan-O-Matic Company, a corporation of Pennsylvania
Filed May 26, 1961, Ser. No. 112,934
14 Claims. (Cl. 51—134.5)

This invention relates to a grinding apparatus and the like, and more particularly concerns an apparatus of this type in which a rotary grinding wheel is initially operated at a predetermined peripheral grinding speed, which speed is substantially maintained while the diameter of the grinding wheel is reduced due to work performing wear thereof, so as to effect maximum grinding efficiency of the grinding wheel and a substantial increase in the working life thereof; the inventive subject matter hereof being a continuation-in-part of the inventive subject matter of my copending application Serial No. 17,134 which was filed March 23, 1960, now Patent No. 2,994,994 dated August 8, 1961.

One object of my invention is to provide a novel and improved grinding apparatus of the type indicated that includes ultrasonic means in cooperative combination with other elements to thereby effect certain new, desirable and advantageous results.

Another object is to provide such an apparatus having certain structural and functional features of advantage over the similar type apparatus of the prior art.

A further object is to provide such an apparatus having a novel ultrasonic system that is responsive to certain incremental diameter reductions of the grinding wheel and adapted to effect an increase in the velocity of the grinding wheel in compensating relation with said grinding wheel diameter reductions.

An additional object is to provide such a grinding apparatus which is adapted to have cooperatively combined therewith in substantially interchangeable manner, either a photoelectric system as disclosed in my said copending application, or an ultrasonic system as disclosed in the present application.

Another object is to provide such an apparatus which comprises, a rotatably mounted grinding wheel, means for rotating said grinding wheel at a velocity establishing a predetermined peripheral grinding speed, means for periodically increasing the velocity of the grinding wheel in compensating relation wtih certain incremental diameter reductions thereof resulting from work performing wear, and ultrasonic means that is responsive to said certain incremental diameter reductions of the grinding wheel and adapted to actuate said velocity increasing means, whereby the said predetermined peripheral grinding speed is substantially maintained during the entire working life of the grinding wheel.

It is also an object to provide such an apparatus that includes one or more features in cooperative combination, such as:

(1) A variable speed drive operable by a constant speed electric motor for rotating the grinding wheel.

(2) A carriage for supporting the constant speed electric motor and operable when certain incremental diameter reductions of the grinding wheel take place so as to effect a change in the variable speed drive, whereby the velocity of the grinding speed is increased to an extent which will substantially maintain the initial predetermined peripheral grinding speed throughout the life of the grinding wheel.

(3) A transmission or auxiliary motor and means operated thereby to effect the shifting of said constant speed motor carriage in such manner that the operating characteristics of the variable speed drive will be varied.

(4) An ultrasonic system responsive to certain incremental diameter reductions of the grinding wheel for controlling the positioning of the constant speed motor.

(5) A transducer unit and an ultrasonic beam receiving unit, which units are axially aligned with each other and mounted in holders positioned adjacent to the peripheral edge of the grinding wheel in such manner as to effect the energization of an electric relay when a certain incremental diameter reduction of the grinding wheel occurs.

(6) A mechanism operatively connected to said transmission motor for simultaneously moving said holders relative to the peripheral edge of the grinding wheel when the carriage of the constant speed motor is shifted, whereby the said transducer unit and ultrasonic beam receiving unit are simultaneously compensatively repositioned after a predetermined reduction in the diameter of the grinding wheel occurs.

(7) Means associated with the front end of the transducer unit for determinedly condensing, or selectively establishing the diameter or cross-sectional area of the ultrasonic beam emitted from the unit.

With these and other objects in view, which will become more readily apparent from the following detailed description of my various unique, practical and illustrative developments shown in the accompanying drawings, the present invention comprises the novel apparatus, elements, features of construction and arrangement of parts in cooperative relationship, as more particularly indicated and defined by the hereto appended claims.

In the accompanying drawings:

FIGURE 1 is a top plan view of one form of grinding apparatus in accordance with my invention;

FIGURE 2 is a side elevational view of the apparatus shown in FIG. 1;

FIG. 3 is an elevational sectional view, taken substantially as indicated by the arrows 3—3 on FIG. 2, but with certain parts of the upper portion being shown in full;

FIG. 4 is an elevational sectional view, taken substantially as indicated by the arrows 4—4 on FIG. 3;

FIG. 7 is an elevational sectional view, taken substantially as indicated by the arrows 7—7 on FIG. 1;

FIG. 8 is an elevational sectional view, taken substantially as indicated by the arrows 8—8 on FIG. 1;

FIG. 13 is a wiring diagram of the combined electric power system of the grinding apparatus and the ultrasonic system.

Figure 5:
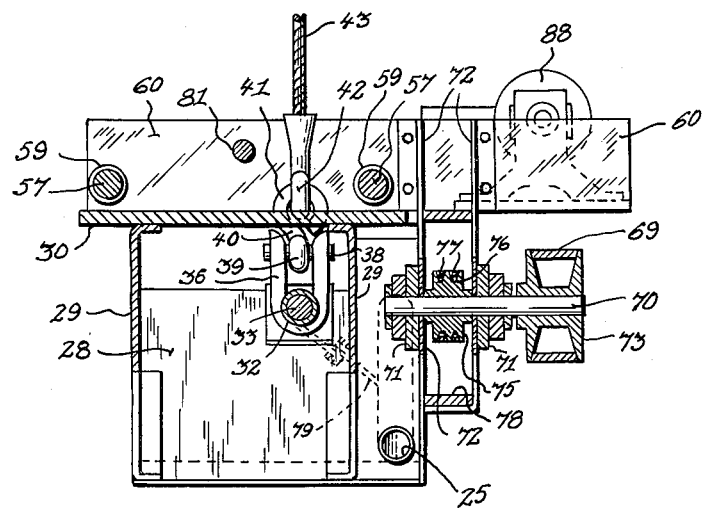
FIG. 5 is an elevational sectional view, taken substantially as indicated by the arrows 5—5 on FIG. 1.

Referring to the drawings, in which similar reference characters designate corresponding parts, the new and improved grinding apparatus of my invention is preferably, but not necessarily, of the swing frame type, having a grinding wheel 23 at its front end and an electric motor 24 at its rear end for operating the grinding wheel 23.

The grinding apparatus comprises an elongated main frame member 25, with which sub-frame members of various shapes and sizes are united to provide a unitary rigid structure of great strength for supporting the several elements, units and mechanisms comprising the grinding apparatus, as hereinafter more fully described.

The main frame member 25 is preferably formed of a suitable length of tubular rod or pipe and has mounted on the underside thereof at its rear end, a rod or pipe 26 which is arranged substantially at right angles to the member 25 and projects laterally therefrom to provide a support for a bracket 27.

The bracket 27 extends upwardly from the rod 26, at a suitable angle and in a direction toward the front end of the main frame member 25, and provides a support for a metal plate 28.

Arranged in suitable spaced relationship and extending upwardly and rearwardly from the plate 28, are the legs 29 of a bracket 30.

Depending from the bracket 30, and arranged between the legs 29 thereof, is a hanger 31 which is provided with a tubular boss 32 for the rear end portion of a shaft 33.

The shaft 33 is arranged lengthwise of the grinding apparatus and has its front end mounted in the tubular boss 34 of a bracket 35 fixedly secured to the main frame member 25 at a suitable distance forwardly from the rod 26.

A U-shaped yoke 36, slidably mounted on the shaft 33 and held from sliding movement thereon by a pair of collars 37 arranged at opposite sides of said yoke, is provided with a pin 38 for the lower eye 39 of a double-eyed link 40. The upper eye 41 of the link 40 is arranged to receive a hook 42 on the lower end of a cable 43, by means of which the grinding apparatus is suspended from a suitable overhead support (not shown).

By securing the suspension cable 43 with the yoke 36, as indicated, the grinding apparatus can be initially balanced by separating the collars 37 from the yoke and thereafter shifting the position of the yoke lengthwise of the shaft 33 until the desired balanced condition is obtained. The collars 37 are then moved against the opposite sides of the yoke 36 and fixed in position on the shaft 33 by means of set screws 44, as indicated in FIG. 8.

By suspending the balanced grinding apparatus from a cable, as above described, the grinding apparatus is freely movable into various and numerous operating positions and at various angles in relation to the material or object to be worked.

A bracket 46, fixedly secured to the front end of the main frame member 25, provides a support for a rotatable spindle or shaft 47.

The spindle 47 is journalled in spaced ball bearings 48 mounted in the bracket 46 in the manner shown in FIG. 3, so that one end of the spindle extends outwardly from one side of said bracket and the other end of said spindle extends outwardly from the opposite side of the bracket 46.

A pulley 50, fixedly mounted on one end portion of the spindle 47, is formed with axially spaced annular belt grooves 51.

The intermediate portion of the spindle 47 is formed with a flange 52 which provides a shoulder for an annular spacer disk 53.

The grinding wheel 23 is mounted on the spindle 47 and clamped between the disk 53 and another spacer disk 54 which is pressed flush against the other face of the grinding wheel 23 by nuts 55 on the outer threaded end of the spindle 47. The manner in which the grinding wheel 23 is mounted on the spindle 47 follows the well known prior art practice in this field.

The upper face of the bracket 30 has a pair of spaced bosses 56 formed thereon, in each of which bosses is mounted the intermediate portion of a round rod or bar 57.

As more clearly shown in FIG. 1, the two rods or bars 57 are arranged in parallel spaced relationship and one portion 57a of each of said rods extends rearwardly from the bracket 30 for a suitable distance. The other portions 57b of the bars 57 extend forwardly from the bosses 56 and the front ends thereof are mounted in bosses 59 of a vertically arranged plate constituting a bracket 60.

The upper or top portion of each rear rod or bar portion 57a is formed with a groove or depression 61 which is arranged lengthwise thereof so as to serve as a track and receive therein wheels 62 of a carriage 63.

Figure 6:
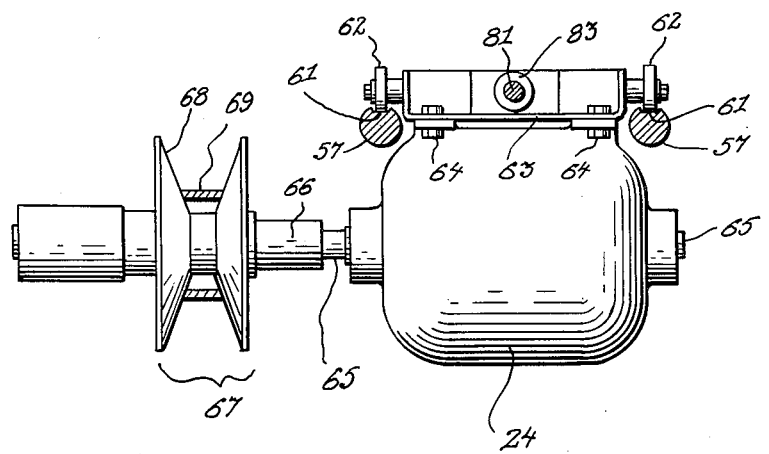
FIG. 6 is an elevational sectional view, taken substantially as indicated by the arrows 6—6 on FIG. 1.

As more clearly shown in FIGS. 1, 2 and 6, the construction and arrangement of the carriage 63 is such that the latter is positioned between the spaced parallel rods or bars 57 and the wheels 62, at each side of the carriage 63, are arranged to ride in the tracks provided by the grooves 61, so that the carriage 63 is movable lengthwise of the apparatus in directions toward and away from the grinding wheel 23.

The electric motor 24, which is of the constant speed type, is bolted or otherwise fastened to the underside of the carriage 63, as indicated by the bolts 64, and said motor is arranged under said carriage 63 in such manner that its drive shaft 65 projects laterally from one side of the carriage, in the manner shown in FIGS. 1 and 6.

On the outer end of the motor drive shaft 65, is mounted the hub 66 of a variable speed pulley 67, which latter is of a standard commercial variety such as manufactured and sold by the Lovejoy Flexible Coupling Company of Chicago, Illinois, or the Gerbing Manufacturing Company of Elgin, Illinois. The pulley 67 has a pair of sheaves movable toward and away from each other to provide a V-shaped groove 68 for an endless wide V-belt 69. As the groove 68, between the sides of the pulley 67, is made wider, the belt 69 drops deeper into the groove, thereby decreasing the sheave diameter or pitch of the pulley, as will be clear from FIG. 6. Conversely, narrowing the groove 68 moves the belt 69 outwardly in relation to the pulley and increases the effective diameter or pitch of the pulley 67, for a purpose to be hereinafter more fully described.

By referring to FIG. 5, it will be noted that a jack shaft 70 is rotatably supported by bearings 71 carried by a bracket 72 on the frame plate 60 and is provided with a pulley or sheave 73 having an annular V-shaped belt groove. The wide V-belt 69 passes around the pulleys 67 and 73 and imparts rotation to the jack shaft 70 from the motor drive shaft 65.

A second pulley or sheave 75 is fixedly mounted on the jack shaft 70 and is formed with axially spaced annular V-shaped belt grooves 76.

A pair of endless V-belts 77 pass around the pulleys 50 and 75 and provide a driving connection by which the grinding wheel 23 is operated by power derived from the electric motor 24.

As a safety measure, the belts 77 may be enclosed by a guard housing 78, which is supported from the main frame member 25 by brackets 79 and 80, arranged in the manner shown in FIGS. 1 and 2.

The driving arrangement just described is such that, while the motor drive shaft 65 operates at a constant number of revolutions per minute, the number of revolutions per minute of the grinding wheel sprindle 47, and the jack shaft 70, can be varied, so that as the diameter of the grinding wheel 23 is reduced due to work performing wear thereof, the peripheral speed or velocity of the grinding wheel 23 will be maintained substantially at the predetermined grinding speed at which a new grinding wheel of predetermined diameter operates when initially installed on the spindle 47.

With the grindling wheel 23 at its predetermined maximum diameter, as shown in FIGS. 2, 3 and 4, the shaft 65 of the electric motor 24 is disposed a distance from the jack shaft 70 by which the drive belt 69 is disposed near the bottom of the groove 68 of the pulley 67, in the manner shown in FIG. 6. In this position the sleeve or pitch diameter of the pulley 67 is such that the driven belts 77 operate at a speed by which the grinding wheel 23 is rotated at the predetermined number of revolutions per minute to attain the desired initial peripheral grinding speed or velocity.

This peripheral grinding speed or velocity of the grinding wheel 23 may be substantially maintained as the diameter of grinding wheel is reduced due to work performing wear thereof, by adjusting the speed rotation of the jack shaft 70. This adjustment of speed rotation of the jack shaft 70 is obtained by shifting the position of the electric motor carriage 63 on the tracks provided by the two grooved rods or bars 57, to thereby move the electric motor 24 and its drive shaft 65 closer to the jack shaft 70, as between the motor position A and B indicated by dot-and-dash lines in FIG. 2, which action automatically effects a change in the pitch diameter of the variable speed pulley 67.

Arranged lengthwise of the grinding apparatus and disposed between the rods or bars 57, is a rotatable rod 81 having a screw threaded portion 82 which extends through a threaded nut 83 fixedly mounted at one end of the motor carriage 63.

The end of the rod 81, opposite to the screw threaded portion 82, is provided with a bevel gear 85, the teeth of which are in meshing relationship with the teeth of a bevel gear 86 on a shaft 87 of a servo or transmission motor arrangement or unit 88, carried by a bracket 89 secured to the frame member 60.

The transmission motor unit 88 illustrated, is of the type available on the open market. Such units are made and sold by The Master Electric Company of Dayton, Ohio, and by U.S. Electric Motors, Inc. of California, or Milford, Conn. and are generally identified as a right angle combination induction gear motor unit, 220 volt, 60 cycles, one-half horsepower, 1 phase, 1750 r.p.m., repulsion start, output speed 58 r.p.m., ratio 30 to 1. The motor of such a unit has an adjustable magnetic brake cooperatively combined therewith.

The rotation of the shaft 87 of the transmission motor unit 88 is transmitted by the gears 86 and 85 to the rod 81, the threaded portion of which is turned in the nut 83, to thereby move the carriage 63, and the electric motor 24, in a direction lengthwise of the apparatus.

By referring to FIG. 3, it will be noted that the bracket 46 has connected thereto a hood 91 which partly encloses the upper portion of the grinding wheel 23, has an outer semicircular or arcuate wall 92 and flat side walls 93 and 94.

The hood 91 is of such size that the walls 92, 93 and 94 are arranged in suitable spaced relationship with respect to the grinding wheel 23 and provide the means for preventing particles of metal and other material from flying toward the operator when the apparatus is in use.

The side wall 93 has an elongated slot 95 formed vertically therein and the side wall 94 has a similar elongated slot 96 formed therein, which slots are arranged in opposed aligned relationship with each other.

As shown in FIGS. 3 and 4, the slots 95 and 96 are arranged at opposite sides of the grinding wheel 23 and are disposed in perpendicular relation to the axis of rotation of the grinding wheel. The slots 95 and 96 have a length extending from a point above the top edge portion of an unused grinding wheel to a point near the hub thereof, to thereby expose the side surfaces of the grinding wheel through said slots when sighted in the direction crosswise of the hood 91, in a manner and for a purpose hereinafter more fully explained.

Secured to the lower front portion of the hood 91, and extending forwardly therefrom, are handle bars 98, by means of which an operator is enabled to swing the grinding apparatus about the support provided by the cable 43.

An ultrasonic system, that is responsive to certain incremental diameter reductions of the grinding wheel 23, is provided for controlling the actuation of the grinding wheel velocity increasing means of the apparatus heretofore described, in a manner whereby the initial peripheral grinding speed is substantially maintained during the entire working life of the grinding wheel 23.

The ultrasonic system comprises a standard or conventional type ultrasonic relay unit 100, which is fixedly mounted on the guard 78, as shown in FIGS. 1 and 2. It will be understood that the ultrasonic relay unit 100 may be otherwise mounted or arranged, as desired, or required, under particular operating conditions. In addition to the ultrasonic relay unit 100, the ultrasonic system of the present invention includes various other elements and devices that are identified, arranged and cooperatively combined as hereinafter described.

The ultrasonic relay unit 100 is of the standard commercial variety made and sold for various purposes by the Delavan Manufacturing Company of West Des Moines, Iowa. Such a unit is generally shown and briefly described in catalog 4–1 issued by said company, which catalog is entitled "Sonac-New Ultra-Sonic, Non-Contact Sensing and Switching System." Such an ultrasonic relay unit is designed to close and open electric circuits upon the interruption, or application, of an ultrasonic beam established between two sensors, or between a so-called "transducer" unit (which constitutes an electronic beam source or generating unit) and an ultrasonic beam receiving unit. A booklet entitled "Operating and Instruction Manual" is obtainable from The Aro Equipment Corporation of Bryan, Ohio, a distributor for the said Delavan Manufacturing Company, which booklet describes the operation of an ultrasonic unit of the Sonac type used in cooperative combination with the grinding apparatus of my invention. For further information concerning the construction and operation of the said ultrasonic relay unit and the equipment cooperatively associated therewith, reference may be had to the literature relative to the same which is made available to the public by the said Delavan Manufacturing Company and by its distributor, the Aro Equipment Company of Bryan, Ohio.

The said transducer unit and ultrasonic beam receiving unit of the ultrasonic system of my invention are mounted for simultaneous movement in a certain relationship with the peripheral edge of the grinding wheel 23, and to make this clear, the mechanism for effecting such movement will next be described.

On the hood 91 is a bracket 101 for a pair of fixed standards 102 upon which is slidably mounted a carrier frame 103 of inverted U-shape, having a pair of depending legs 104 and 105 arranged in suitably spaced relationship outwardly with respect to said standards, as shown in FIG. 3.

Centrally located between the standards 102, there is a vertically arranged shaft 107, the lower end of which is journalled in a bearing 108 that is fixed to the bracket 101.

The upper end of the shaft 107 is provided with a screw threaded portion 110, for engagement with the similarly threaded bore of a boss 111 formed on the carrier frame 103.

The intermediate portion of the shaft 107 is journalled in a bearing 113 secured to the leg 114 of a bearing bracket 115 that is united with the bracket 101 on the hood 91.

The construction and arrangement of the parts is such that the upper end portion of the shaft 107 has a threaded connection 110 with the carrier frame 103 at a point located a considerable distance above the bearing 113, so that rectilinear movements for predetermined distances can be imparted to the carrier frame 103 when the shaft 107 is rotated to turn the threaded portion 110 thereof in the threaded bore of the boss 111.

Arranged lengthwise of the apparatus, is a shaft 121, which is journalled in bearings 122 and 123 (see FIGS. 1 and 3).

One end of the shaft 121 has a bevel gear 125 fixedly secured thereto, the teeth of which are in meshing relationship with the teeth of a bevel gear 126 secured on the shaft 87 of the transmission motor unit heretofore referred to.

The other end of the shaft 121 has a bevel gear 127 fixed thereon, the teeth of which are in meshing relationship with the teeth of a bevel gear 128 secured on the shaft 107, in the manner shown in FIGS. 3 and 4.

Rotation of the shaft 87 by the transmission motor unit 88 is transmitted by the gears 126, 125, to the shaft 121, and from thence by the gears 127 and 128 to the shaft 107, to thereby effect sliding movement of the carrier frame 103 on the standards 102 in either up or down direction for the purpose hereinafter more fully explained.

Bolted or otherwise secured to the bottom ends of the legs 104 and 105 of the frame 103, are two bracket-like clamp members 129 and 130, each of which is adapted to hold for axial adjustment therein a split sleeve-like element respectively designated 131 and 132, in which are mounted the two previously referred to sensor units of the ultrasonic system (see FIGS. 3, 4, 9 and 10) which are respectively identified by the reference numerals 133 and 134. Of these sensor units, the unit 133 constitutes the transducer unit, i.e., the ultarsonic beam generating unit and the unit 134 constitutes the ultarsonic beam receiving unit. When mounting the sensor units 133 and 134, they are first inserted into the split sleeve-like elements 131 and 132 and the latter are then inserted into the split bracket clamp members 129 and 130. Each of the clamp members 129 and 130 is provided with screw bolts as shown, which are tightened after the sensor units 133 and 134 have been axially spaced from each other and relative to the sides of the grinding wheel, at the peripheral edge of the latter, as desired, or required for best operating results. I have found in practice that the sensor units 133 and 134 will function as desired to effect the results of my invention when they are initially placed in opposed axial alignment with each other so that the center of the ultrasonic beam, designated B in FIG. 9, coincides substantially with the peripheral edge 23ª of the grinding wheel 23, as indicated in FIGS. 9 and 10.

Figure 10:
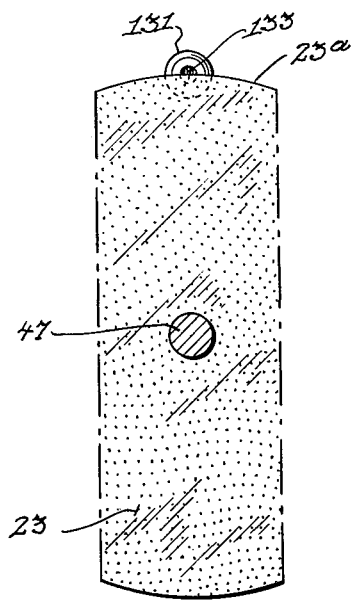
FIG. 10 is an elevational view of certain parts shown in FIG. 9, as seen by looking in the direction of the arrows 10—10 of FIG. 9.
Figure 9:
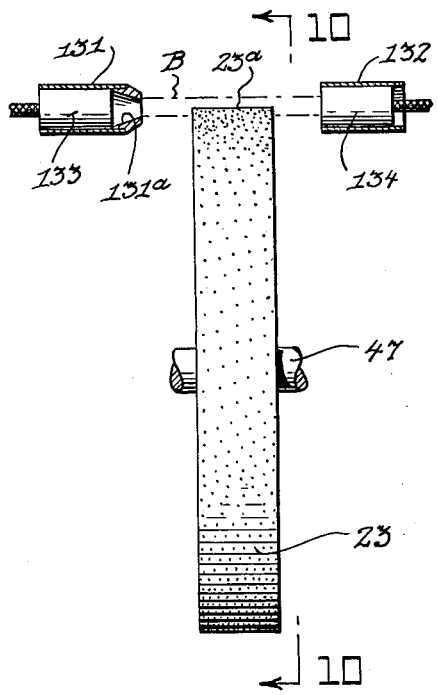
FIG. 9 is a diagrammatic view of the transducer unit and ultrasonic beam receiving unit, as substantially initially arranged at the peripheral edge of a new or unused grinding wheel that is installed in operative position on the grinding apparatus.

Accordingly, when setting up the apparatus for operation, a new or unused grinding wheel 23, of predetermined diameter, is mounted on the apparatus and the carrier frame 103 is then adjusted vertically so that the ultarsonic beam B emanating from the transducer unit 33 is directed sidewise toward the top edge of the grinding wheel so that the center of the beam B coincides substantially with the peripheral edge 23ª at the upper end of the grinding wheel 23, as shown in FIGS. 9 and 10. Such vertical adjustment of the carrier frame 103, will effect positioning of the ultrasonic beam receiving or sensor unit 134 in axial alignment with the transducer unit 133 and in cooperating spaced relation therewith at the opposite side of the grinding wheel 23, as clearly shown in FIGS. 3 and 9.

In order to provide an ultrasonic beam of a desired cross-sectional area and intensity, the front end of the split sleeve element 131 is internally provided with a conical surface 131ª that tapers forwardly. This surface 131ª functions to condense, or bend toward the center of the beam B, the lines of force of the ultrasonic beam emanating from the front of the transducer unit 133 that are blocked by said surface. In this manner the said lines of forces are condensed into the smaller circular cross-sectional area represented by the front opening of the element 131, which opening can be made smaller to a selectively determined extent than the front circular cross-sectional area of the transducer unit 133.

In practice I have found that when the ultrasonic beam B is established as indicated and blocked off by the grinding wheel as shown, the amount, or force, of the ultrasonic beam received by the sensor element 134 will be insufficient to effect operation of the ultrasonic system. However, as soon as the peripheral edge of the grinding wheel is reduced by work wear to the extent of about $\frac{1}{32}$ of an inch, the cross-sectiional area of the beam B will be increased by an amount sufficient to energize the sensor unit 134 to the point where the ultrasonic system will immediately operate.

Referring now to the wiring diagram of FIG. 13, it will be noted that the apparatus of my invention is designed to be operated by a 220 volt electric current arranged from a suitable source, supplied by main line conductors $L_1$, $L_2$ and $L_3$.

A master switch device 140 is electrically connected to the line conductors $L_1$, $L_2$, $L_3$ for controlling the flow of current to the several circuits.

The master switch device 140 comprises a push button start switch 141, a push button stop switch 142 and an overload reset switch 143.

The drive motor 24 is directly connected by conductors 144, 145 and 146 to the master switch device 140 so that when the push button start switch 141 is operated to close the circuit, said motor will be supplied with 220 volt current and will be immediately activated. In this way the grinding wheel 23 is rotated by the driving connection from the motor 24 provided by the belt 69, jack shaft 70, and belts 77, in the manner heretofore described.

The motor 24 is a standard 220 volt, two phase, 60 cycle, 1750 r.p.m., 20 H.P. motor and is of the constant speed type.

A control or safety switch 147 is connected to the main line conductors $L_1$ and $L_3$ by wires 148 and 149 and to the primary coil of a conventional 220–110 volt transformer T by wires 150 and 151.

The circuit arrangement controlled by the safety switch 147 includes the circuitry of the ultrasonic system of the grinding apparatus, as well as certain other circuits whereby the servo motor unit 88 is caused to operate in the manner of my invention. This circuit arrangement generally includes the transformer T, the ultrasonic relay unit 100, the ultrasonic sensors 133 and 134, an auxiliary relay 152, a two second amperite safety tube or time delay switch 153, a magnetic servo motor control switch 154, a manual reversing switch 155 and a key operated by-pass switch 156.

The ultrasonic relay unit 100 is provided with a panel substantially as indicated in FIG. 13, having various usual elements arranged thereon, such as connecting terminals that are numbered 1 to 11 inclusive, a plug-in output relay R, a gain increase knob K, and a fuse device F.

The various parts comprising the circuit arrangement controlled by the safety switch 147 are connected with each other, substantially as follows:

The secondary coil of the transformer T is connected to the terminals 4 and 5 of the unit 100 by two conductors 157 and 158.

The transducer, or ultrasonic beam generating unit 134 is connected to the terminals 6, 7 and 8 of the unit 100 by conductors 159, 160 and 161. The sensor unit 133, which receives the ultrasonic beam B, is connected to the terminals 9, 10 and 11 of the unit 100 by conductors 162, 163 and 164.

The auxiliary relay 152 functions to operate the magnetic servo motor control switch 154 and comprises a movable contact element 165 that is intermediately arranged for engagement with one or the other of two stationary contact elements 166 and 167. The relay 152 is provided with a coil 168, which when energized effects movement of the contact element 165 into engagement with the contact element 167. The relay 152 also includes a coil 169 which when energized, closes the servo motor control switch 154. The movable contact element 165 is connected by a wire 170 with a conductor 171.

One end of the coil 169 is connected to a conductor 172 by a wire 173. The other end of the coil 169 is connected by a conductor 173ª with one of the two switch elements of the amperite tube 153, and the other switch element of said tube is connected by a wire 174 with the contact element 167 of the auxiliary relay 152. The conductors 171 and 172 are connected with the conductors 150 and 151.

The coil 168 has its ends connected to the terminals 2 and 3 of the unit 100, by wires 175 and 176, and the heating coil 177 of the amperite tube 153 is connected in parallel with the coil 168 by wires 178 and 179.

One terminal of the key operated by-pass switch 156 is connected with the wire 170 and the other terminal of said switch 156 is connected with the conductor 173ª.

The upper two terminals of the manual reversing switch 155 are connected with the magnetic servo motor control switch 154, and the lower terminals of said switch 155 are connected to the servo motor 88 by conductors 180 and 181.

From the foregoing description of the circuits controlled by the safety switch 147, it will be apparent that when the switch 147 is closed, the various elements and units of these circuits will be caused to cooperatively function in a manner, substantially as follows:

An ultrasonic beam B will be established between the sensor units 133 and 134, by their connection with the terminals 6, 7, 8, 9, 10 and 11 of the unit 100. However, as previously explained in connection with the description of FIGS. 9–12 inclusive, the ultrasonic beam B is initially established in crosswise extending relation with the peripheral edge of a new grinding wheel 23 and arranged to be blocked by said edge to such an extent that said beam cannot effect functioning of the various devices of the unit 100 until work wear of the peripheral edge of the grinding wheel has taken place to the extent of a diameter reduction of the latter by about 1⁄32 of an inch.

Assuming that the motor 24 and grinding wheel 23 are in operation and that the peripheral edge of the latter has been reduced by work wear to the extent of about 1⁄32 of an inch in the diameter of the grinding wheel, then the ultrasonic beam B will be unblocked to the peripheral edge of the grinding wheel to such an extent that the cross-sectional area of the ultrasonic beam B will be sufficiently large to cause functioning of the ultrasonic control system established through the unit 100.

Coil 168 will then be energized by current flow from the terminals 2 and 3 of the unit 100, through wires 175 and 176, and this will cause immediate engagement of contact element 165 with contact element 167. When the contact elements 165 and 167 are engaged with each other, a current flow will be established in the circuit which includes contact elements 165 and 167, conductor 174, the two closed switch elements of amperite tube 153, conductor 173ª, coil 169 and conductors 173, 172, 151, 150, 171 and 170.

The magnetic servo motor control switch 154 will be closed by energization of the coil 169, so that the servo motor 88 will be connected to the conductors 150 and 151 through magnetic switch 154, manual reversing switch 155 and conductors 180 and 181.

Current flow will also take place through the heating element 177 of the amperite tube 153, since said element is connected by conductors 178 and 179 with the conductors 175 and 176. However, the current flow through the heating element 177 is of such low capacity as not to cause the development of any appreciable heat in the coil, so that the two switch elements of the amperite tube 153 will remain in contact with each other.

Normally, operation of the servo motor 88 will take place to move the motor 24 forwardly, by rotating rod 81 until the speed of the grinding wheel 23 has been increased to the compensating extent of its work wear diameter reduction of 1⁄32 of an inch and simultaneously therewith the servo motor 88, by rotation of shaft 121, will compensatingly move the carrier frame 103 to a position whereby the sensors 133 and 134 are again in the same positional relation with the peripheral edge of the grinding wheel as before. The blocking of the ultrasonic beam B to the same extent as before will then cause the unit 100 to interrupt the current flow through the coil 168 and thereby cause opening of the magnetic servo motor control switch 154 so that the servo motor 88 will stop.

In the event that the electrical system of the apparatus should improperly function and thereby cause the servo motor 88 to continue to operate after the point of discontinuance of operation has been reached, as described in the preceding paragraph, then the unit 100 will cause the 110 volt current connected through terminals 4 and 5 to flow through terminals 2 and 3 thereby immediately heating the coil 177 of the two second amperite tube 153, so that the switch elements of the latter will become separated and thereby open the circuit which includes the coil 169 and thus effect the opening of the magnetic servo motor control switch 154. The servo motor 88 will consequently be stopped and the velocity at which the grinding wheel 23 is rotating at that time will become fixed. In this manner, the grinding wheel 23 will be prevented from attaining a velocity at which it may explode, in the event that improper functioning of the electrical system of the apparatus should take place as indicated. When such an improper functioning occurrence takes place, the operator will, of course, open the safety switch 147 so as to stop the apparatus, determine the cause of the failure and correct the same.

*Operation*

Figure 12:
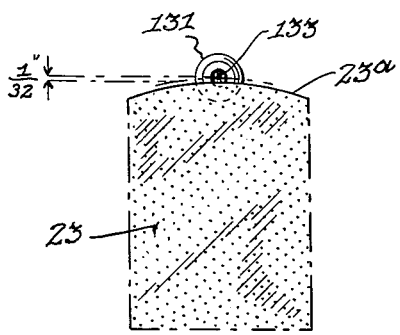
FIG. 12 is a view similar to FIG. 10, but with the parts shown in the relationship of FIG. 11.
Figure 11:
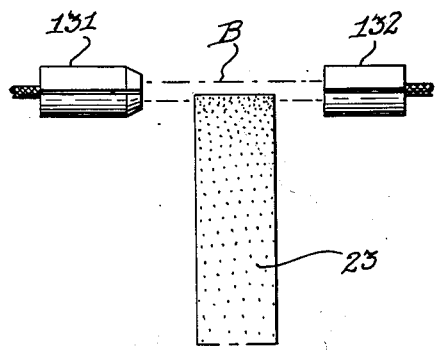
FIG. 11 is a diagrammatic view, similar to FIG. 1, but indicating a certain diametrical wear reduction of the grinding wheel and its relation to the ultrasonic beam, at which the ultrasonic system will function to effect a compensating adjustment of the grinding wheel speed and simultaneously therewith a resetting of the transducer unit and ultrasonic beam receiving unit.

From the foregoing description of the various parts of my apparatus and the manner in which they perform their intended functions, it will be apparent that the operation of the apparatus is, in general, substantially as follows:

Let it be assumed that a new grinding wheel 23 has been installed for use by the apparatus and that the various parts of the apparatus are arranged for functioning as shown in the drawings, then as the periphery 23ª of the grinding wheel 23 wears away from work performing wear to the extent of about 1⁄32 of an inch, as indicated in FIGS. 11 and 12, the ultrasonic beam B will be unblocked an amount sufficient to increase the intensity of the beam so that the sensor unit 132 will be energized. This will cause the unit 100 to operate the auxiliary relay switch 152 and thereby effect closing of the magnetic servo motor control switch as previously explained.

Operation of the servo motor 88 imparts rotation to the rod 81 and the shaft 121, thereby simultaneously shifting the positions of the motor carriage 63 and the carrier frame 103, in the manner heretofore described, so that the motor 24 is moved closer to the jack shaft 70 and the ultrasonic beam units, or sensors 133 and 134 are lowered. Repositioning of the motor 24 will cause an increase in the velocity of the grinding wheel 23, in compensating relation with its diameter reduction due to work wear, so that the grinding speed of the peripheral edge 23ª is substantially the same as it was initially. Downward movement of the sensor units 133 and 134 will return these units to a position in which the periphery 23ª of the grinding wheel 23 intercepts the ultrasonic beam B, thereby cutting off the intensity of the beam and de-energizing the sensor 133. This will result in the unit 100 to cease passing current from terminals 2 and 3 to the coil 168 and thereby cause the auxiliary relay 157 to open the magnetic servo motor control switch 154, as previously explained. The servo motor 88 will then stop until another reduction of the diameter of the grinding wheel 23 occurs, when the operation described will be repeated.

When the grinding wheel 23 is worn away, as the result of work performing wear, to such a small diameter that its working life comes to an end, the operator sets the manual reversing switch 155 for reverse operation of the motor 88, inserts a key in the key operated by-pass switch 156 (see FIG. 13), so as to cause a current flow through a closed circuit which includes switch 156, conductors 170, 171, 150, 151, 172, 173, coil 169 and conductor 173a, thereby to effect closing of the magnetic servo motor control switch and operation of the servo motor 88 in reverse until the motor carriage 63 has been returned rearwardly to the proper extent and the carrier frame 103 has been returned upwardly to a position at which the worn grinding wheel can be replaced with a new grinding wheel. The various parts of the apparatus are then adjusted so that the sensors 133 and 139 are again in operative position as before with the peripheral edge 23a of the grinding wheel 23, as indicated in FIGS. 9 and 10.

Modifications

It will be understood by those skilled in this art that the improvements specifically shown and described can be changed and modified in various ways without departing from the invention herein disclosed, the scope of which is more particularly indicated and defined by the hereto appended claims.

It will also be understood that my invention can be applied in the same or in a similar manner to an apparatus other than a swing grinding apparatus, wherein the wearing away, or the reduction in the diameter, or a change in the contour or size of an operative element, is to periodically effect a compensating or corresponding change in the functioning of such apparatus, automatically in the manner and for a purpose, substantially as exemplified by the disclosure hereof.

Furthermore, if desired, certain items, elements, or devices may be added to the apparatus which are of the type more or less commonly utilized to effect known results in this art.

I claim:

1. An apparatus of the character described comprising, a rotatably mounted grinding wheel, means for rotating said grinding wheel at a velocity establishing a predetermined peripheral grinding speed, means for periodically increasing the velocity of the grinding wheel in compensating relation with certain small incremental diameter reductions thereof resulting from work performing wear, and an ultrasonic system that develops a high power ultrasonic beam having a small cross-sectional area responsive to said certain small incremental diameter reductions of the grinding wheel for actuating said velocity increasing means whereby the said predetermined peripheral grinding speed is substantially maintained during the entire working life of the grinding wheel.

2. An apparatus in accordance with claim 1, wherein the ultrasonic system includes an amperite safety tube arranged to effect speed fixation of the grinding wheel when due to improper functioning of the apparatus the grinding wheel abnormally attains a velocity that exceeds said predetermined peripheral grinding speed.

3. An apparatus in accordance with claim 1, wherein the ultrasonic system includes a transducer unit and an ultrasonic beam receiving unit which units are positioned in spaced axial alignment with each other so that the ultrasonic beam will extend transversely of the peripheral edge of the grinding wheel.

4. An apparatus in accordance with claim 1, wherein the ultrasonic system includes a transducer unit and an ultrasonic beam receiving unit which units are arranged so as to be positionable in adjustably spaced axial alignment with each other.

5. An apparatus in accordance with claim 1, wherein the means for periodically increasing the velocity of the grinding wheel includes a variable speed drive operable by a constant speed motor.

6. An apparatus in accordance with claim 1, wherein the means for periodically increasing the velocity of the grinding wheel includes a variable speed drive operable by a constant speed motor supported by a carriage movable when certain incremental diameter reductions of the grinding wheel are attained to shift the position of said motor and thereby effect a change in the variable speed drive.

7. An apparatus in accordance with claim 1, wherein the means for periodically increasing the velocity of the grinding wheel includes a variable speed drive operable by a constant speed motor on a carriage movable by a mechanism operated by a transmission motor device which is operative when certain incremental diameter reductions of the grinding wheel occur to shift the position of the carriage and thereby effect a change in the operating characteristics of the variable speed drive.

8. An apparatus in accordance with claim 1, wherein the means for periodically increasing the velocity of the grinding wheel includes a variable speed drive operable by a constant speed motor on a carriage movable by a mechanism operated by a transmission motor device which is activated by the ultrasonic system when certain incremental diameter reductions of the grinding wheel occur to shift the position of the carriage and thereby effect a change in the operating characteristics of the variable speed drive.

9. An apparatus in accordance with claim 1, wherein the ultrasonic system includes an ultrasonic beam receiving unit mounted in a holder positioned adjacent to the peripheral edge of the grinding wheel and arranged to energize an electric relay when certain incremental reductions of the grinding wheel are attained.

10. In an apparatus of the character described, having in combination with a grinding wheel, means for rotating said grinding wheel, and speed change means for varying the rotary speed of said grinding wheel in accordance with the change in diameter of the grinding wheel resulting from wear in the use thereof so as to maintain a substantially predetermined peripheral speed of the grinding wheel; of an ultrasonic system that develops a high power ultrasonic beam of small cross-sectional area sensitive to small incremental changes in the diameter of the grinding wheel and periodically operative when such small incremental changes occur to effect operation of said speed change means to thereby substantially maintain the predetermined peripheral speed of the grinding wheel.

11. An apparatus of the character described comprising, a rotatably mounted grinding wheel, means for rotating said grinding wheel at a velocity establishing a predetermined peripheral grinding speed, means for periodically increasing the velocity of the grinding wheel in compensating relation with certain small incremental diameter reductions thereof resulting from work performing wear, and ultrasonic means that develops a high power ultrasonic beam having a small cross-sectional area responsive to said certain small incremental diameter reductions of the grinding wheel for actuating said velocity increasing means whereby the said predetermined peripheral grinding speed is substantially maintained during the entire working life of the grinding wheel.

12. An apparatus in accordance with claim 11, wherein said ultrasonic means includes a transducer unit having at the front end thereof means provided with a conical surface for determinedly reducing the cross-sectional area of the ultrasonic beam emitted from the unit.

13. An apparatus in accordance with claim 11, wherein said ultrasonic means includes a transducer unit, and a separate element mounted at the front end of said unit which element is adapted to effect the condensation of the ultrasonic beam emitted from said unit to a determined cross-sectional area extent.

14. An apparatus of the character described comprising, a main frame, a grinding wheel mounted on said frame for rotation at a velocity establishing a predetermined substantially constant grinding speed as its diameter decreases due to work performing wear, a jack shaft, means for operating the grinding wheel from the jack shaft at a substantially fixed ratio, a drive motor, a carriage slidably mounted on the frame for supporting the drive motor in a number of positions relative to said jack shaft as the diameter of the grinding wheel decreases, ultrasonic means that develops a high power ultrasonic beam of small cross-sectional area responsive to a small diameter change of the grinding wheel for periodically effecting movement of said carriage from one of said positions to another, means for driving the jack shaft from said motor, and means responsive to a change in the position of the motor carriage relative to said jack shaft for varying the ratio of the drive connection from said motor to said jack shaft to maintain a substantially constant grinding speed of the grinding wheel as it wears away.

References Cited in the file of this patent

UNITED STATES PATENTS

| | | |
|---|---|---|
| 1,934,859 | Joaquin et al. | Nov. 14, 1933 |
| 2,361,217 | Lewis | Oct. 24, 1944 |
| 2,426,312 | Lewis | Aug. 26, 1947 |
| 2,457,695 | Liskow | Dec. 28, 1948 |
| 2,509,345 | Howell et al. | May 30, 1950 |
| 2,649,538 | Marlowe et al. | Aug. 18, 1953 |
| 2,963,627 | Buchsbaum | Dec. 6, 1960 |
| 2,994,994 | Lonaberger | Aug. 8, 1961 |